United States Patent
Liu et al.

(10) Patent No.: US 10,567,076 B2
(45) Date of Patent: Feb. 18, 2020

(54) METHODS FOR CALIBRATING OLTS AND DETERMINING OPTICAL LOSS

(71) Applicant: AFL Telecommunications LLC, Duncan, SC (US)

(72) Inventors: Bin Liu, Chestnut Hill, MA (US); Shawn P. Collins, Pembroke, NH (US); Scott Prescott, Belmont, NH (US); Dale Eddy, Gilford, NH (US); Magdy Sadek, Nashua, NH (US); Gaurav Girish, Dracut, MA (US)

(73) Assignee: AFL Telecommunications LLC, Duncan, SC (US)

(*) Notice: Subject to any disclaimer, the term of this patent is extended or adjusted under 35 U.S.C. 154(b) by 35 days.

(21) Appl. No.: 15/807,088

(22) Filed: Nov. 8, 2017

(65) Prior Publication Data

US 2019/0140739 A1    May 9, 2019

(51) Int. Cl.
*H04B 10/079* (2013.01)
*H04B 10/077* (2013.01)
*H04B 10/564* (2013.01)
*H04Q 11/00* (2006.01)
*H04B 10/25* (2013.01)
*G01M 11/00* (2006.01)

(52) U.S. Cl.
CPC ....... *H04B 10/07955* (2013.01); *G01M 11/33* (2013.01); *H04B 10/0775* (2013.01);
(Continued)

(58) Field of Classification Search
CPC . G01J 1/0425; H04B 10/07955; H04B 10/54; H04B 10/0775; H04B 10/2503;
(Continued)

(56) References Cited

U.S. PATENT DOCUMENTS 5,455,672 A * 10/1995 Lamonde ............ G01M 11/333
                                                    356/73.1
8,411,259 B2 * 4/2013 Levin ................. G01M 11/3127
                                                    356/73.1
(Continued)

FOREIGN PATENT DOCUMENTS

CN      103207012 A  *  7/2013
CN      105790831 A  *  7/2016
(Continued)

OTHER PUBLICATIONS

AFL Telecommunications LLC; International Patent Application No. PCT/US2018/059520; International Search Report; dated Apr. 30, 2019; (2 pages).

*Primary Examiner* — Amritbir K Sandhu
(74) *Attorney, Agent, or Firm* — Dority & Manning, P.A.

(57) ABSTRACT

A method for calibrating an OLTS includes calibrating a first optical power meter of the OLTS using a stabilized light source. The method further includes calibrating a second optical power meter of the OLTS using the stabilized light source. The method further includes setting a power of an internal light source using the calibrated first optical power meter. A calibration cable is connected to a first test port and a second test port during setting of the power level, and a connection of the calibration cord to the second test port is maintained between calibrating of the second optical power meter and setting of the power level.

12 Claims, 5 Drawing Sheets

(52) U.S. Cl.
CPC ....... *H04B 10/564* (2013.01); *H04Q 11/0005* (2013.01); *H04B 10/2503* (2013.01); *H04B 2210/07* (2013.01); *H04Q 2011/0041* (2013.01)

(58) Field of Classification Search
CPC . H04B 10/564; H04B 2210/07; G01M 11/00; G01M 11/33; H04Q 11/0005; H04Q 2011/0041
USPC ........................................................ 398/9–38
See application file for complete search history.

(56) References Cited

U.S. PATENT DOCUMENTS

| | | | |
|---|---|---|---|
| 9,515,726 B2 * | 12/2016 | Adam | H04B 10/07953 |
| 9,880,069 B1 * | 1/2018 | Adam | G01M 11/33 |
| 10,107,714 B2 * | 10/2018 | Xu | H04B 10/071 |
| 10,139,274 B2 * | 11/2018 | Schell | G01M 11/33 |
| 10,416,040 B1 * | 9/2019 | Prescott | G01M 11/33 |
| 10,420,609 B2 * | 9/2019 | Tang | A61B 90/06 |
| 2012/0314209 A1 | 12/2012 | Doddridge | |
| 2015/0010302 A1 * | 1/2015 | Eddy | H04B 10/07955 398/34 |
| 2016/0337034 A1 * | 11/2016 | Ruchet | H04B 10/07955 |
| 2016/0356670 A1 * | 12/2016 | Brillhart | G01M 11/3136 |
| 2018/0149556 A1 * | 5/2018 | Adam | H04B 10/0731 |
| 2018/0266808 A1 * | 9/2018 | Shaar | G01M 11/3109 |
| 2018/0375574 A1 * | 12/2018 | Eddy | H04B 10/07955 |

FOREIGN PATENT DOCUMENTS

| | | |
|---|---|---|
| EP | 3032237 A2 | 6/2016 |
| WO | WO-2017181916 A1 * | 10/2017 |

* cited by examiner

METHODS FOR CALIBRATING OLTS AND DETERMINING OPTICAL LOSS

FIELD

The present disclosure relates generally to methods for calibrating optical loss test sets ("OLTSs") and methods for determining optical loss in fiber optic cables.

BACKGROUND

Light source power meter methods are generally known and utilized in the fiber optics industry to measure the insertion losses of the optical fibers in fiber optic cables. Typically a fiber optic cable under test may be connected between two test cables. One test cable is connected to a light source, and the other test cable is connected to a power meter. Light is transmitted from the light source through the test cables and fiber optic cable to the power meter, and the loss in an optical fiber of the fiber optic cable is determined based on the measured power at the power meter and the power measured by referencing the light source to the power meter directly.

Modern methods for measuring such losses utilize OLTSs. In general, an OLTS includes an internal light source and a power meter. Two OLTS units can be utilized to measure bi-directional losses in a fiber optic cable.

To ensure accurate measurements, various test standards require that the test cable connected to the light source is not disconnected after referencing the light source to the power meter. However, such standards present difficulties when utilizing OLTSs and measuring bi-directional losses.

Accordingly, improved methods for calibrating OLTSs which eliminate the need to disconnect the test cable from the light source of the OLTS would be advantageous. Further, improved methods for testing fiber optic cables which reduce errors in loss measurements would be advantageous.

BRIEF DESCRIPTION

Aspects and advantages of the invention will be set forth in part in the following description, or may be obvious from the description, or may be learned through practice of the invention.

In accordance with one embodiment, the present disclosure is directed to a method for calibrating an OLTS. The method includes calibrating a first optical power meter of the OLTS using a stabilized light source. The first optical power meter is in optical communication with a first test port of the OLTS, and a calibration cable is connected to the first test port and the stabilized light source during calibrating of the first optical power meter. The method further includes calibrating a second optical power meter of the OLTS using the stabilized light source. The second optical power meter and an internal light source of the OLTS are in optical communication with a second test port of the OLTS, and the calibration cable is connected to the second test port and the stabilized light source during calibrating of the second optical power meter. The method further includes setting a power of the internal light source using the calibrated first optical power meter. The calibration cable is connected to the first test port and the second test port during setting of the power level, and a connection of the calibration cord to the second test port is maintained between calibrating of the second optical power meter and setting of the power level.

In accordance with another embodiment, the present disclosure is directed to a method for determining optical loss in a fiber optic cable. The method includes measuring a first reference power level for light transmitted from an internal light source of a first calibrated OLTS at a first set power through a first test cable. The method further includes measuring a second reference power level for light transmitted from an internal light source of a second calibrated OLTS at a second set power through a second test cable. The method further includes connecting the fiber optic cable to the first test cable and the second test cable. The method further includes measuring a first power level of light transmitted from the internal light source of the first OLTS at the first set power through the first test cable, the fiber optic cable, and the second test cable. The method further includes calculating a first loss level of the fiber optic cable. The first loss level equals the first reference power level minus the measured first power level minus a difference between the second set power and the second reference power level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Figure 1:
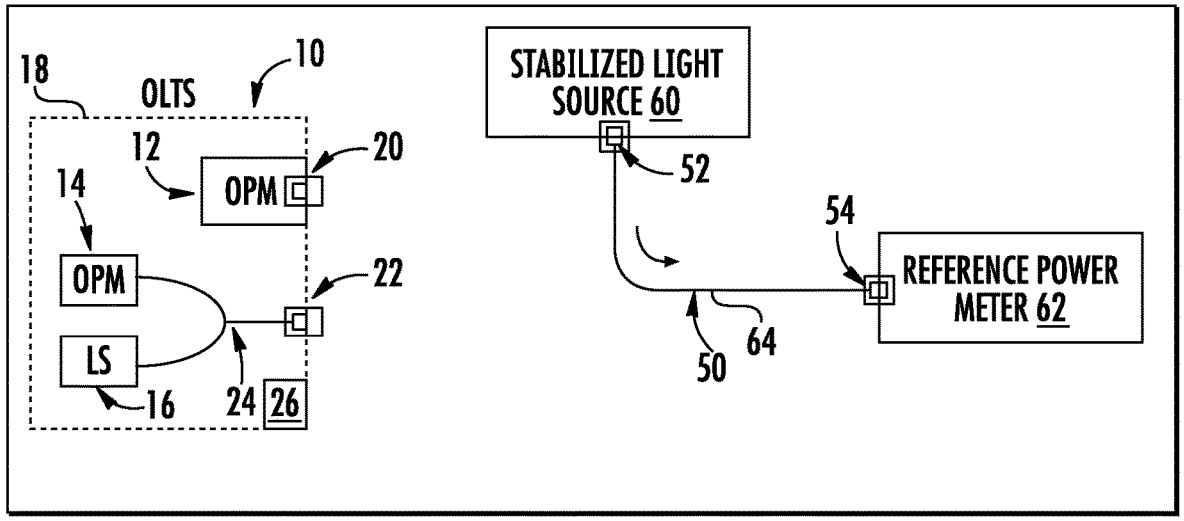
FIG. 1 is a schematic illustrating a reference power level being obtained in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 11, the present disclosure is generally directed to methods and apparatus which advantageously facilitate improved insertion loss testing and OLTS accuracy. Referring for example to FIGS. 8 through 11, an OLTS 10 in accordance with the present disclosure includes a first optical power meter 12, a second optical power meter 14, and an internal light source 16. The optical power meters 12, 14, and internal light source 16 may be generally disposed within a body 18 of the OLTS.

First optical power meter 12 may be accessible via a first test port 20 which is in optical communication with the first optical power meter 12. Accordingly, light may be transmitted to the first optical power meter 12 through and from the first test port 20. First test port 20 may be contact-based test port or contactless test port, and a suitable connector of a suitable cable as discussed herein may be connected to the test port to facilitate optical communication with the first test port 20.

Second optical power meter 14 may be accessible via a second test port 22 which is in optical communication with the second optical power meter 14. Accordingly, light may be transmitted to the second optical power meter 14 through and from the second test port 22. Second test port 22 may be contact-based test port or contactless test port, and a suitable connector of a suitable cable as discussed herein may be connected to the test port to facilitate optical communication with the second test port 22.

Additionally, internal light source 16 may be accessible via the second test port 22, which may also be in optical communication with the internal light source 16. Accordingly, light may be transmitted from the internal light source 16 to and through the second test port 22. An optical branching device 24 (which may for example include a splitter and/or other suitable apparatus, such as optical fiber stubs, etc., for providing such branching) extending between the internal light source 16, second optical power meter 14, and second test port 22 may, for example, optically connect the second test port 22 with both the second optical power meter 14 and the internal light source 16.

OLTS 10 may further include a controller 26. The controller 26 may be in communication with other components of the OLTS 10, including the first optical power meter 12, second optical power meter 14, and internal light source 16. Controller 26 may be configured and operable to cause such other components to perform the various operations and method steps as discussed herein.

Controller 26 may generally comprise a computer or any other suitable processing unit. For example, the controller 26 may include one or more processor(s) and associated memory device(s) configured to perform a variety of computer-implemented functions, as discussed herein. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 26 to perform various computer-implemented functions including, but not limited to, performing the various steps discussed herein. In addition, the controller 26 may also include various input/output channels for receiving inputs from and for sending control signals to the various other components of the OLTS 10, including the first optical power meter 12, second optical power meter 14, and internal light source 16, as well as to components of other OLTSs 10 in a system of OLTSs.

Figure 8:
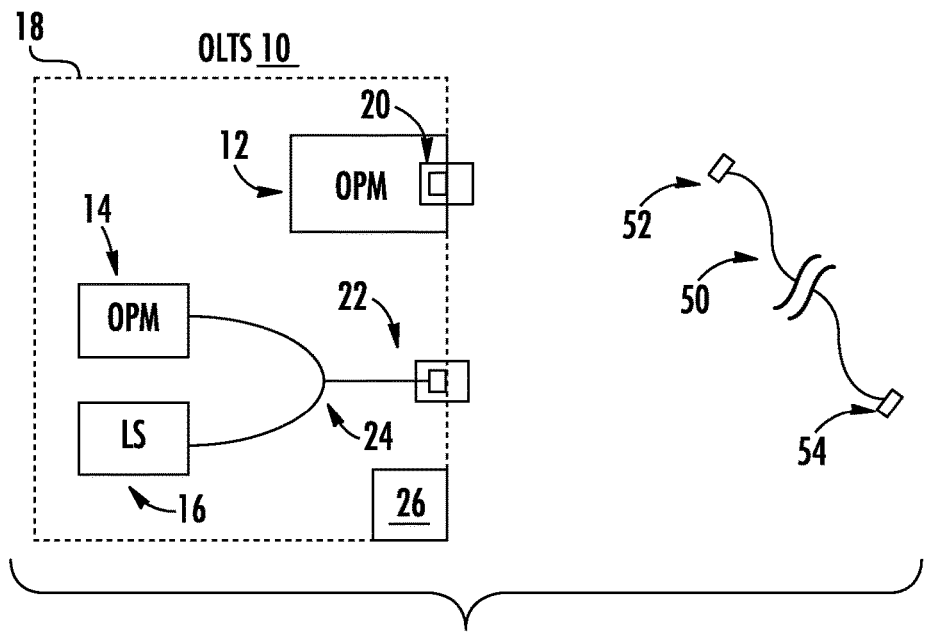
FIG. 8 is a schematic illustrating an OLTS for use with cables having single-fiber connectors in accordance with embodiments of the present disclosure.
Figure 9:
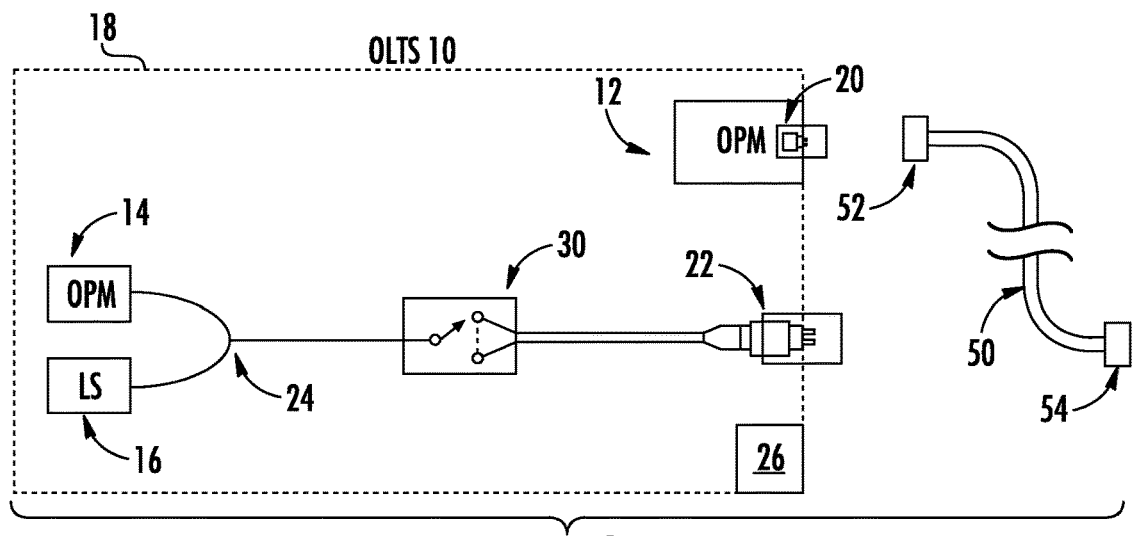
FIG. 9 is a schematic illustrating an OLTS for use with cables having multiple-fiber connectors in accordance with embodiments of the present disclosure.
Figure 10:
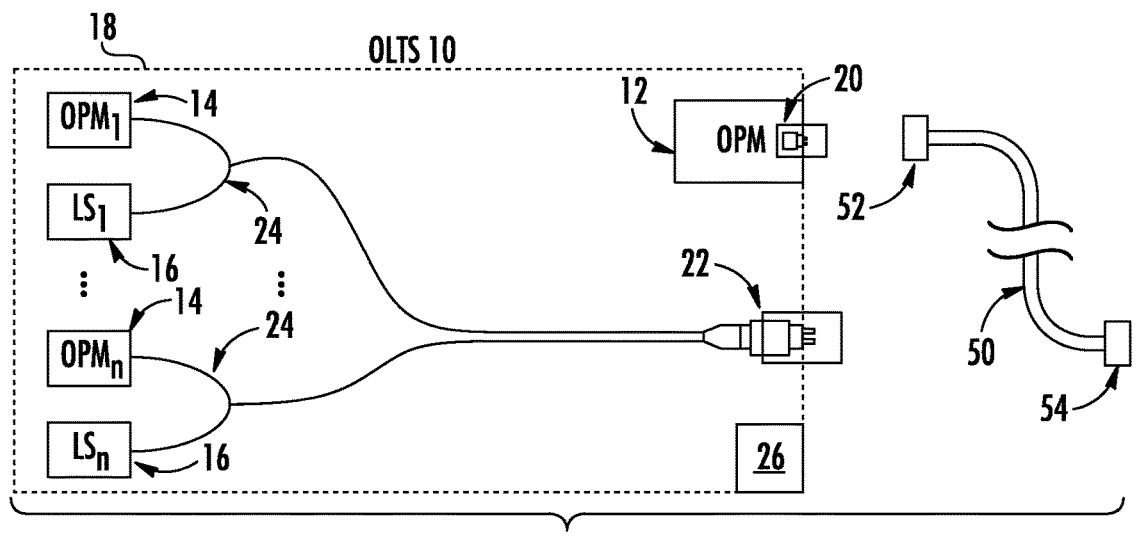
FIG. 10 is a schematic illustrating an OLTS for use with cables having multiple-fiber connectors in accordance with other embodiments of the present disclosure.
Figure 11:
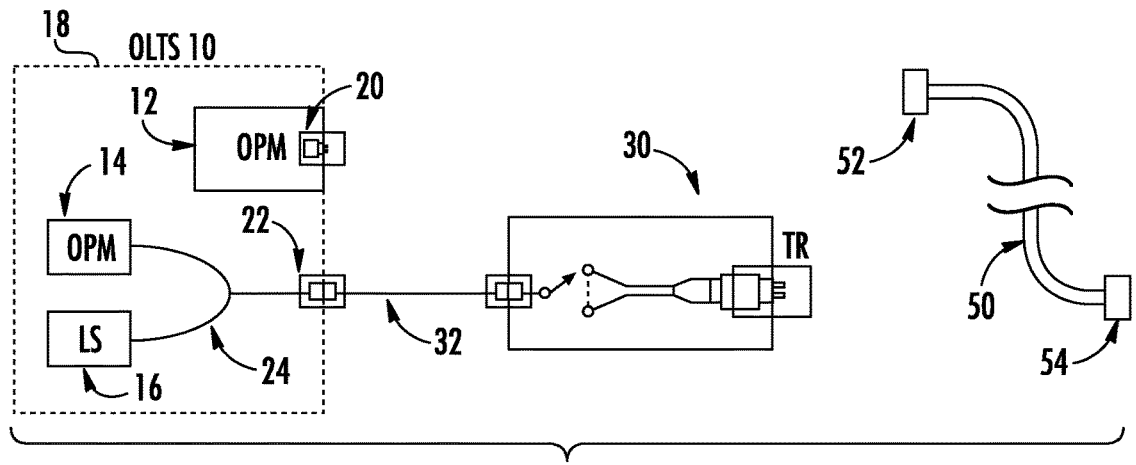
FIG. 11 is a schematic illustrating an OLTS for use with cables having multiple-fiber connectors in accordance with other embodiments of the present disclosure.

As further illustrated, a cable 50 may be connected to the OLTS 10 during calibration of the OLTS 10. Cable 50 may extend between a first end 52 and a second end 54, and a connector may be disposed at each end to facilitate the various necessary connections. In some embodiments, as illustrated in FIG. 8, the cable 50 is a single-fiber cable which includes only a single optical fiber. In these embodiments, only a single second optical power meter 14 and internal light source 16 are needed, and the connectors are single-fiber connectors. In other embodiments, as illustrated in FIGS. 9 through 11, the cable 50 is a multiple-fiber cable which includes a plurality of optical fibers. In these embodiments, one or more sets of second optical power meter 14 and internal light source 16 may be needed, and the connectors are multiple-fiber connectors, such as Multiple-Fiber Push-On ("MPO") connectors.

In multiple-fiber embodiments, additional components may be included to facilitate the various connections with the OLTS. For example, in some embodiments as illustrated in FIGS. 9 and 11, an optical switch 30 may be provided. In some embodiments, the optical switch 30 may be included in the OLTS 10, such as disposed within the body 18. For example, the optical switch 30 may be disposed between the second test port 22 and the second optical power meter 14 and internal light source 16, such as along the second test port-side leg of the optical branching device 24. In other embodiments, as illustrated in FIG. 11, the optical switch 30 may be external to the OLTS 10, and any connection to the second test port 22 may be an indirect connection through the optical switch 30 and a patch cable 32 (which may be a cable 50 as discussed herein). Optical switch 30 may, in these embodiments, provide switching between the various fibers of a multiple-fiber cable connected to the second test port 22, to allow optical communication between each optical fiber and the second optical power meter 14 and internal light source 16 within the OLTS 10.

In other embodiments, as illustrated in FIG. 10, multiple sets of second optical power meter 14 and internal light source 16 are provided in the OLTS 10. When connected to the second test port 22, each optical fiber of a multiple-fiber cable may be in optical communication with one of the plurality of sets of second optical power meter 14 and internal light source 16.

As discussed, the connection to second test port 22 of a multiple fiber cable 50 may in some embodiments, as illustrated in FIG. 11, be indirect. In other embodiments, as illustrated in FIGS. 8, 9, and 10, the connection to second test port 22 of a multiple fiber cable 50 may be direct.

Referring now to FIGS. 1 through 4, methods for calibrating an OLTS 10 are provided. It should be understood that in exemplary embodiments, one or more controllers 26 may be utilized to perform the various steps as discussed herein. To calibrate such OLTS, a stabilized light source 60 may be utilized. A stabilized light source 60 is generally a light source that has a constant, non- or low-fluctuating power output over a given period of time at a specific ambient temperature, for example ±0.05 dB for 1 hour at 23° C. Additionally, a reference power meter 62 may be utilized. The reference power meter 62 may in some embodiments be utilized to obtain a reference power level for use during calibration of the OLTS 10. In exemplary embodiments, the reference power meter 62 may be a National Institute of Standards and Technology ("NIST") calibrated power meter 62. An NIST calibrated power meter 62 is capable of making measurements which are NIST traceable. In exemplary embodiments, the reference power meter 62 may be calibrated to the NIST Measurement Assurance Program (42140M) Absolute Responsivity standard. Alternatively, the reference power meter 62 may be calibrated to another suitable U.S. calibration standard, such as another suitable NIST standard, or to another suitable national standard of a country in which the reference power meter 62 is produced. Stabilized light source 60 and reference power meter 62 may each include a controller 26 which controls operation thereof.

Further, a calibration cable 64 (which may be any suitable cable 50 as discussed herein). Notably, a single calibration cable 64 may be utilized for all steps involved in a method for calibrating an OLTS in accordance with the present disclosure. Accordingly, inaccuracies in calibration due to the use of different cables 64 having different loss levels is eliminated.

Referring for example to FIG. 1, a method for calibrating an OLTS 10 in accordance with the present disclosure may, for example, include the step of obtaining a reference power level for light transmitted at a predetermined power from the stabilized light source 60. For example, the stabilized light source 60 may be activated to emit light at a predetermined power. The power of this light at a receipt location of the light, such as the reference power meter 62, may be measured to obtain the reference power level. In exemplary embodiments, the reference power level is obtained by transmitting the light from the stabilized light source at the predetermined power to the reference power meter 62, such as through the calibration cable 64 as shown. For example, the calibration cable 64 may be connected (such as at a first end 52) to the stabilized light source 60 and (such as at a second end 54) to the reference power meter 62, and light may be transmitted from the stabilized light source 60 to the reference power meter 62 through the calibration cable 64.

Figure 2:
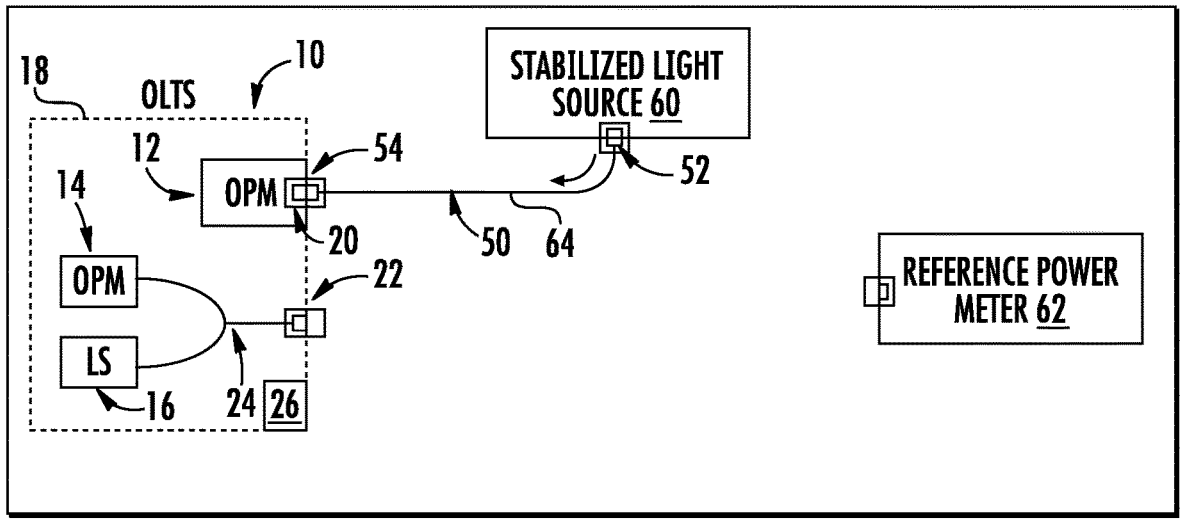
FIG. 2 is a schematic illustrating a first optical power meter of an OLTS being calibrated in accordance with embodiments of the present disclosure.

Referring for example to FIG. 2, a method for calibrating an OLTS 10 in accordance with the present disclosure may, for example, include the step of calibrating the first optical power meter 12 of the OLTS 10 using the stabilized light source 60. During such calibration, the calibration cable 64 (such as the second end 54 thereof) may be connected to the first test port 20 of the OLTS 10. Further, during such calibration, the calibration cable 64 (such as the first end 52 thereof) may be connected to the stabilized light source 60.

In some embodiments, the second end 54 of the calibration cable 64 may be moved from the reference power meter 62 (see FIG. 1) to the first test port 20 (see FIG. 2) after obtaining the reference power level to calibrate the first optical power meter 12. Disconnection of the first end 52 from the stabilized light source 60 may not be necessary.

In exemplary embodiments, the first optical power meter 12 may be calibrated to the reference power level for light transmitted from the stabilized light source 60 at the predetermined power. In other words, after the reference power level is obtained, light may be transmitted from the stabilized light source 60 at the predetermined power, such as to the first optical power meter 12 through the calibration cable 64 and first test port 20. The first optical power meter 12 may be adjusted to the reference power level for such light at the predetermined power, and thus be calibrated using the stabilized light source 60.

Figure 3:
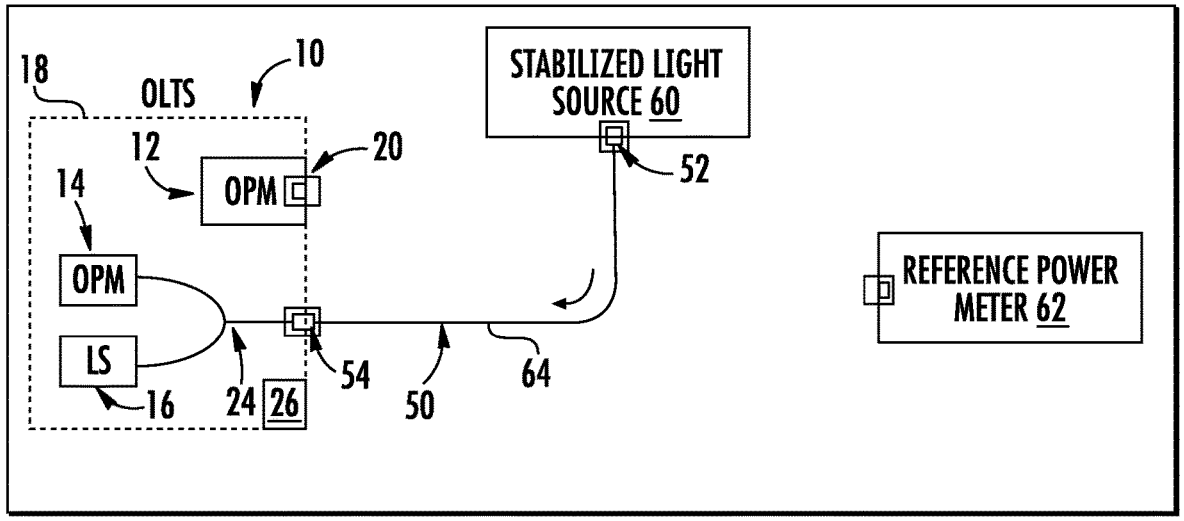
FIG. 3 is a schematic illustrating a second optical power meter of an OLTS being calibrated in accordance with embodiments of the present disclosure.

Referring for example to FIG. 3, a method for calibrating an OLTS 10 in accordance with the present disclosure may, for example, include the step of calibrating the second optical power meter 14 of the OLTS 10 using the stabilized light source 60. Such step may occur after calibration of the first optical power meter 12. During such calibration, the calibration cable 64 (such as the second end 54 thereof) may be connected to the second test port 22 of the OLTS 10. Further, during such calibration, the calibration cable 64 (such as the first end 52 thereof) may be connected to the stabilized light source 60.

In some embodiments, the second end 54 of the calibration cable 64 may be moved from the first test port 20 (see FIG. 2) to the second test port 22 (see FIG. 3) after obtaining the reference power level and calibrating the first optical power meter 12 to calibrate the second optical power meter 14. Disconnection of the first end 52 from the stabilized light source 60 may not be necessary.

In exemplary embodiments, the second optical power meter 14 may be calibrated to the reference power level for light transmitted from the stabilized light source 60 at the predetermined power. In other words, after the reference power level is obtained, light may be transmitted from the stabilized light source 60 at the predetermined power, such as to the second optical power meter 14 through the calibration cable 64 and second test port 22. The second optical power meter 14 may be adjusted to the reference power level for such light at the predetermined power, and thus be calibrated using the stabilized light source 60.

Figure 4:
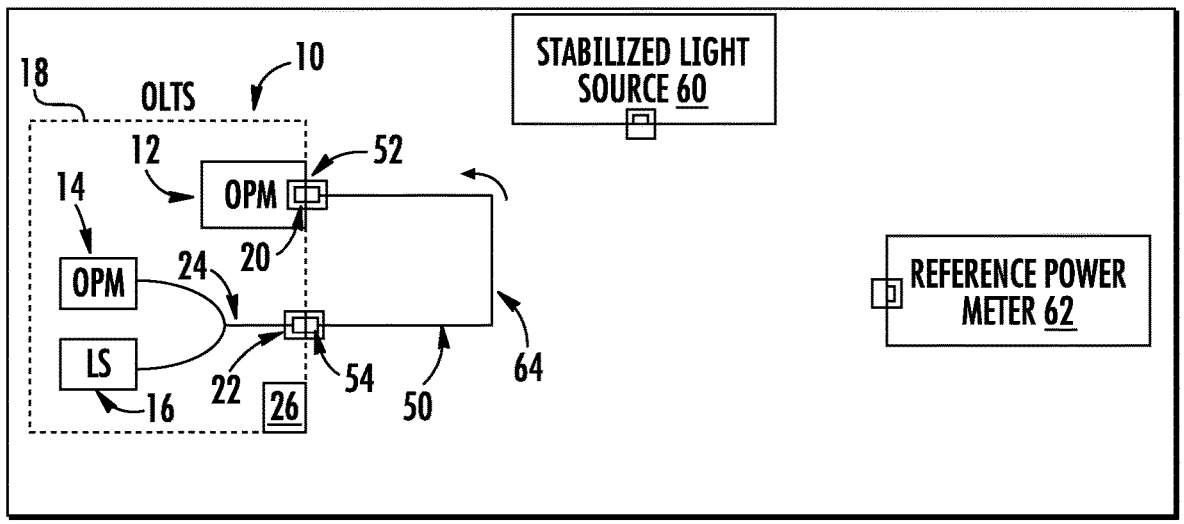
FIG. 4 is a schematic illustrating a power of an internal light source of an OLTS being set in accordance with embodiments of the present disclosure.

Referring for example to FIG. 4, a method for calibrating an OLTS 10 in accordance with the present disclosure may, for example, include the step of setting a power of the internal light source 16 of the OLTS 10 using the calibrated first optical power meter 12. Such setting may occur after calibration of the first optical power meter 12 and second optical power meter 14. By setting the power of the internal light source 16, the power of such internal light source 16 is adjusted to a desired set level, using feedback power levels obtained from the first power meter 12, for subsequent use of such internal light source 16. During such setting, the calibration cable 64 (such as the second end 54 thereof) may be connected to the second test port 22 of the OLTS 10. Further, during such calibration, the calibration cable 64 (such as the first end 52 thereof) may be connected to the first test port 20.

In exemplary embodiments embodiments, the first end 52 of the calibration cable 64 may be moved from the stabilized light source 60 (see FIG. 3) to the first test port 20 (see FIG.

4) after calibrating the second optical power meter 14 to set the power of the internal light source 16. Advantageously, disconnection of the second end 54 from the second test port 22 is not necessary. Accordingly, a connection of the calibration cord 64 to the second test port 22 is advantageously maintained between calibrating of the second optical power meter 14 and setting of the power level.

Figure 5:
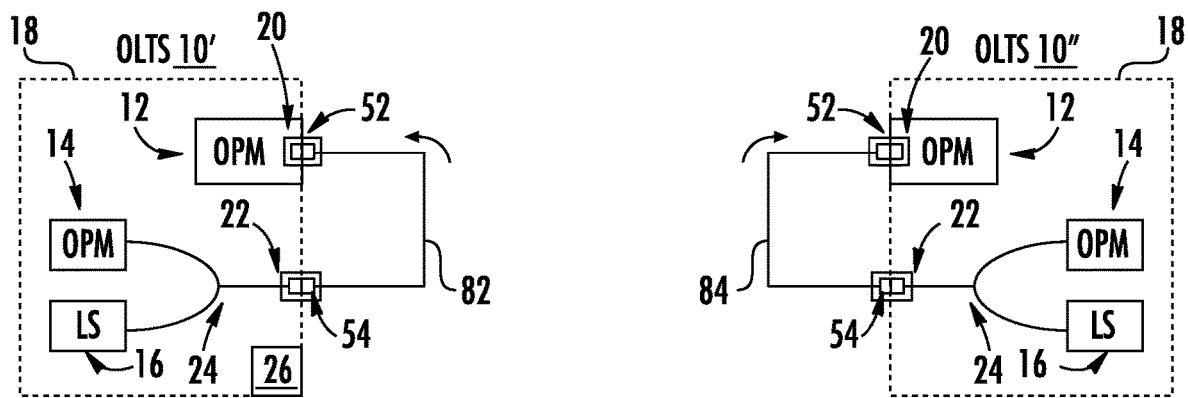
FIG. 5 is a schematic illustrating first and second reference power levels being measured in accordance with embodiments of the present disclosure.
Figure 6:
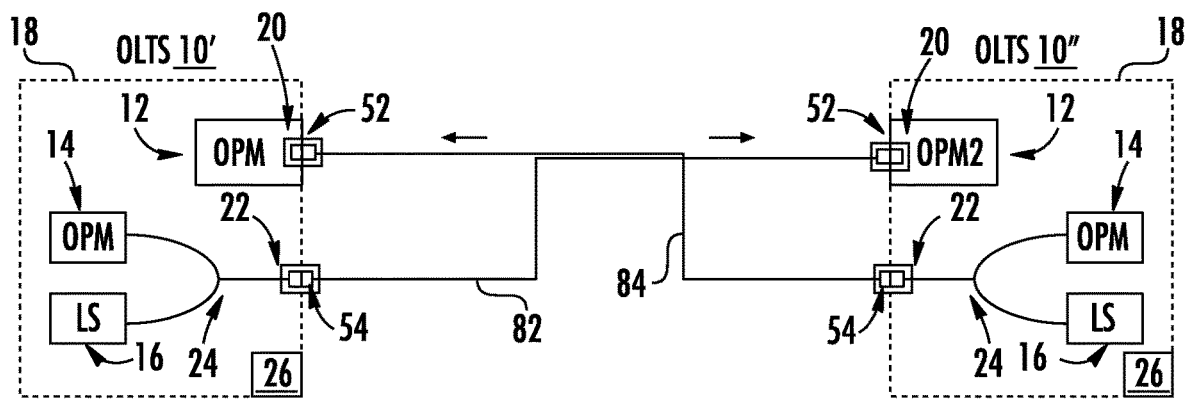
FIG. 6 is a schematic illustrating first and second reference power levels being measured in accordance with other embodiments of the present disclosure.
Figure 7:
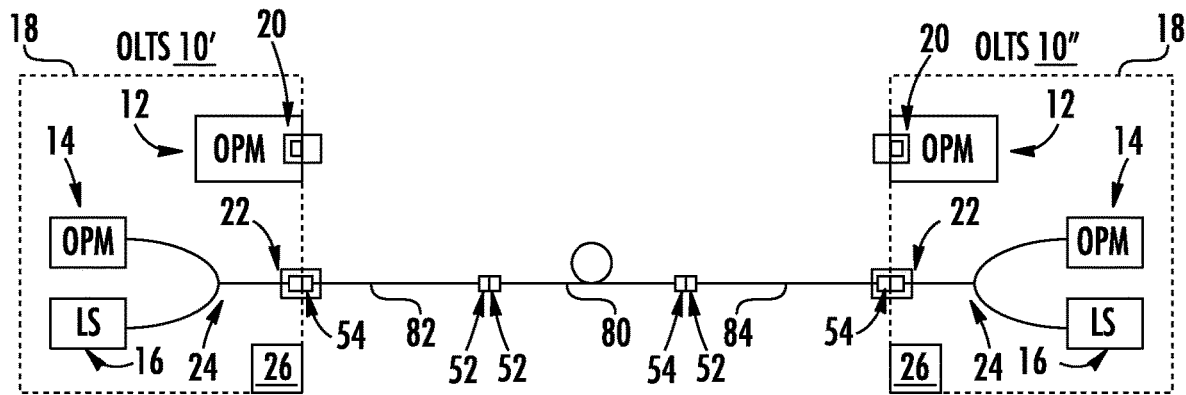
FIG. 7 is a schematic illustrating a fiber optic cable connected to first and second OLTSs for measurement of first and second power levels and calculation of first and second losses in accordance with embodiments of the present disclosure.

Referring now to FIGS. 5 through 7, methods for determining optical loss in fiber optic cables 80 under test are provided. It should be understood that in exemplary embodiments, one or more controllers 26 may be utilized to perform the various steps as discussed herein. To determine optical loss in a fiber optic cable 80, multiple OLTSs and multiple test cables may be utilized. The OLTSs may be calibrated OLTSs, such as calibrated using a method for calibrating an OLTS as described herein or another suitable calibration method. In exemplary embodiments, a first calibrated OLTS 10' and a second calibrated OLTS 10" may be utilized. Further a first test cable 82 and a second test cable 84 may be utilized. Fiber optic cables 80, first test cables 82, and second test cables 84 are, in exemplary embodiments, cables 50 as discussed herein.

Referring now to FIGS. 5 and 6, a method for determining optical loss in a fiber optic cable 80 may include measuring a first reference power level for light transmitted from the internal light source 16 of the first OLTS 10' at a first set power through the first test cable 82. The first set power may, for example, be the power that was set during calibration of the first OLTS 10', as discussed herein, or another suitable set power to which the internal light source 16 of the OLTS 10' is set. To measure the first reference power level, the first test cable 82 (such as a second end 54 thereof) may be connected to the second test port 22 of the first OLTS 10'. Light may be emitted from the internal light source 16 and transmitted from the internal light source 16 through the second test port 22. Such measurement may account for losses in the first test cable 82.

In some embodiments, as illustrated in FIG. 5, the first test cable 82 (such as the first end 52 thereof) may be connected to the first test port 20 of the first OLTS 10'. Accordingly, in some embodiments, the first reference power level may be measured by the first optical power meter 12 of the first OLTS 10'. In other embodiments, as illustrated in FIG. 6, the first test cable 82 (such as the first end 52 thereof) may be connected to the first test port 20 of the second OLTS 10". Accordingly, in some embodiments, the first reference power level may be measured by the first optical power meter 12 of the second OLTS 10".

A method for determining optical loss in a fiber optic cable 80 may further include measuring a second reference power level for light transmitted from the internal light source 16 of the second OLTS 10" at a second set power through the second test cable 84. The second set power may, for example, be the power that was set during calibration of the second OLTS 10", as discussed herein, or another suitable set power to which the internal light source 16 of the OLTS 10" is set. To measure the second reference power level, the second test cable 84 (such as a second end 54 thereof) may be connected to the second test port 22 of the second OLTS 10". Light may be emitted from the internal light source 16 and transmitted from the internal light source 16 through the second test port 22. Such measurement may account for losses in the second test cable 84.

In some embodiments, as illustrated in FIG. 5, the second test cable 84 (such as the first end 52 thereof) may be connected to the first test port 20 of the second OLTS 10". Accordingly, in some embodiments, the second reference power level may be measured by the first optical power meter 12 of the second OLTS 10". In other embodiments, as illustrated in FIG. 6, the second test cable 84 (such as the first end 52 thereof) may be connected to the first test port 20 of the first OLTS 10'. Accordingly, in some embodiments, the first reference power level may be measured by the first optical power meter 12 of the first OLTS 10'.

Referring now to FIG. 7, methods for determining optical loss in a fiber optic cable 80 may include connecting the fiber optic cable 80 to the first test cable 82 and the second test cable 84. Such connecting may, for example, occur after measuring the first and second reference power levels as discussed herein. For example, the first end 52 of the first test cable 82 may be disconnected from the first test port 20 of the first OLTS 10' or second OLTS 10" and connected to a first end 52 of the fiber optic cable 80, and the first end 52 of the second test cable 84 may be disconnected from the first test port 20 of the first OLTS 10' or second OLTS 10" and connected to a second end 54 of the fiber optic cable 80. The second end 54 of the first test cable 82 may remain connected to the second port 22 of the first OLTS 10', and the second end 54 of the second test cable 84 may remain connected to the second port 22 of the second OLTS 10".

Referring still to FIG. 7, methods for determining optical loss in a fiber optic cable 80 may further include measuring a first power level of light transmitted from the internal light source 16 of the first OLTS 10' at the first set power through the first test cable 82, the fiber optic cable 80, and the second test cable 84. For example, the internal light source 16 of the first OLTS 10' may be activated to emit light at the first set power, and such light may be transmitted from the internal light source 16 through the second port 22 to and through the first test cable 82, the fiber optic cable 80, and the second test cable 84. Such light may then be received and measured to determine the first power level thereof. For example, in exemplary embodiments, the first power level is received and measured by the optical power meter 14 of the second OLTS 10".

Such methods may further include calculating a first loss level of the fiber optic cable 80. Such first loss level may be equal to the first reference power level minus the measured first power level minus a difference between the second set power and the second reference power level. Such calculation, and the various actions taken to obtain the various values utilized in the present calculation, advantageously eliminate losses in the first and second test cables 82, 84 from the first loss level and advantageously provide an accurate loss level for the fiber optic cable 80.

Methods for determining optical loss in a fiber optic cable 80 may further include measuring a second power level of light transmitted from the internal light source 16 of the second OLTS 10" at the second set power through the second test cable 84, the fiber optic cable 80, and the first test cable 82. For example, the internal light source 16 of the second OLTS 10' may be activated to emit light at the second set power, and such light may be transmitted from the internal light source 16 through the second port 22 to and through the second test cable 84, the fiber optic cable 80, and the first test cable 82. Such light may then be received and measured to determine the second power level thereof. For example, in exemplary embodiments, the second power level is received and measured by the optical power meter 14 of the first OLTS 10'.

Such methods may further include calculating a second loss level of the fiber optic cable 80. Such second loss level may be equal to the second reference power level minus the measured second power level minus a difference between the first set power and the first reference power level. Such calculation, and the various actions taken to obtain the various values utilized in the present calculation, advantageously eliminate losses in the first and second test cables 82, 84 from the first loss level and advantageously provide an accurate loss level for the fiber optic cable 80.

It should be noted that the first and second loss levels are bi-directional loss levels for the fiber optic cable 80. In other words, the second loss level is the loss level for light in a direction through the fiber optic cable 80 (such as from the second end 54 towards the first end 52) that is opposite the direction of light through the fiber optic cable 80 (such as from the first end 52 towards the second end 54) for which the first loss level is determined.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for calibrating an optical loss test set ("OLTS"), the method comprising:
    calibrating a first optical power meter of the OLTS using a stabilized light source, wherein the first optical power meter is in optical communication with a first test port of the OLTS, wherein a calibration cable is connected to the first test port and the stabilized light source during calibrating of the first optical power meter;
    calibrating a second optical power meter of the OLTS using the stabilized light source, wherein the second optical power meter and an internal light source of the OLTS are in optical communication with a second test port of the OLTS, and wherein the calibration cable is connected to the second test port and the stabilized light source during calibrating of the second optical power meter; and
    setting a power level of the internal light source using the calibrated first optical power meter, wherein the calibration cable is connected to the first test port and the second test port during setting of the power level, and wherein a connection of the calibration cable to the second test port is maintained between calibrating of the second optical power meter and setting of the power level.

2. The method of claim 1, further comprising obtaining a reference power level for light transmitted at a predetermined power from the stabilized light source.

3. The method of claim 2, wherein the reference power level is obtained by transmitting light from the stabilized light source to a reference power meter.

4. The method of claim 3, wherein the reference power meter is a National Institute of Standards and Technology ("NIST") calibrated power meter.

5. The method of claim 2, wherein the first optical power meter is calibrated to the reference power level for light transmitted from the stabilized light source at the predetermined power.

6. The method of claim 2, wherein the second optical power meter is calibrated to the reference power level for light transmitted from the stabilized light source at the predetermined power.

7. The method of claim 2, wherein the calibration cable is connected to the stabilized light source and a reference power meter during obtaining of the reference power level.

8. The method of claim 1, wherein the calibration cable is a single-fiber cable.

9. The method of claim 1, wherein the calibration cable is a multiple-fiber cable.

10. The method of claim 1, wherein the OLTS comprises an optical switch, the optical switch positioned between the second test port and the second optical power meter and the internal light source.

11. The method of claim 1, wherein the connection of the calibration cable to the second test port is a direct connection.

12. The method of claim 1, wherein the connection of the calibration cable to the second test port is an indirect connection through an optical switch.

* * * * *